United States Patent [19]

Kun et al.

[11] Patent Number: 4,900,165
[45] Date of Patent: Feb. 13, 1990

[54] BEARING SUPPORT SYSTEM

[75] Inventors: Leslie C. Kun, Grand Island; Neno T. Nenov, Williamsville, both of N.Y.

[73] Assignee: Union Carbide Corporation, Danbury, Conn.

[21] Appl. No.: 232,173

[22] Filed: Aug. 15, 1988

[51] Int. Cl.⁴ .............................................. F16C 27/02
[52] U.S. Cl. ..................................... 384/220; 384/221; 384/448; 384/536; 384/582
[58] Field of Search ................. 384/99, 220, 221, 535, 384/536, 448, 582

[56] References Cited

U.S. PATENT DOCUMENTS

| 2,551,621 | 5/1951 | Michelsen | 384/536 |
| 2,874,008 | 2/1959 | Orte et al. | |
| 2,986,433 | 5/1961 | Herrmann | |
| 3,101,979 | 8/1963 | Mard | |
| 3,895,689 | 7/1975 | Swearingen | 184/6.4 |
| 4,213,661 | 7/1980 | Marmol | |
| 4,430,011 | 2/1984 | Kun | 384/99 |
| 4,553,855 | 11/1985 | De Choudhury | 384/99 |

Primary Examiner—Lenard A. Footland
Attorney, Agent, or Firm—Stanley Ktorides

[57] ABSTRACT

A bearing support system providing axial thrust load control of bearing supporting a rotating element, by retaining the bearings with a slotted inner ring and supporting the inner ring with a radially spaced outer ring by means of a plurality of circumferentially spaced supports which are radially stiff but axially flexible.

18 Claims, 3 Drawing Sheets

BEARING SUPPORT SYSTEM

TECHNICAL FIELD

This invention relates generally to the field of high-speed rotating machinery and particularly to a support system for the bearings employed therein, and also to the control and modulation of the axial thrust which is imposed on the bearings by the fluid forces and accelerations acting on the rotor.

BACKGROUND ART

The rotors in high-speed machinery are often supported by ball or roller bearings where the outer race is held resiliently in the radial direction with damping provided parallel to the resiliency. While this will protect the bearing against high radial loading, it offers no improvement to reduce the axial bearing forces or to contain their peak magnitude if dynamic conditions are present. In many applications, especially in a turbine driven compressor of the radial flow type, the axial load usually controls the bearing life. Accordingly, in order to achieve the requisite bearing life, the operating thrust load acting on the bearing should be controlled and the effect of the dynamic load on the bearing significantly reduced.

It is known that at times it is quite difficult to calculate the axial load at the design phase and to keep it at a low value acting in a predetermined direction. For example, in the case of a radial turbine driven centrifugal compressor, this is so because the net thrust rotor force is the difference of two relatively large forces which can be determined only approximately by integrating the pressures over the impellers in the axial direction. Furthermore, if the inlet and outlet conditions of the turbine and/or its companion compressor change for planned or unplanned reasons, the magnitude or even the direction of the axial thrust load may be changing. Such an unplanned reason may include, for example, the emergency shutdown of the turbine unit due to causes external to itself. During such a shutdown, for axially fixed races, the stresses between the bearing balls and races may easily rise to a peak value, exceeding the yield point, thus causing serious, life-reducing damages. Changing the direction of the axial load in high speed ball or roller bearings could be instantaneously fatal for both the rotor and bearings since in their axially unloaded position, or sufficiently close to it, multiple impacts, usually referred to as chatter, could develop between the balls or rollers and the races causing considerable surface damage.

An important requirement, for long bearing life, among others, is to set the axial thrust to a predetermined low value, and to control its variations closely around this design preload. To illustrate the magnitude of the various forces by ratios, the desirable design axial load action on the bearing might only be 1/5 to 1/10 of the actual uncontrolled axial hydraulic load. The axial load acting on the bearing should be kept within 20 to 30 percent of the design axial load acting on the bearing for safe operation and maximum bearing life. Scalloping the turbine or the compressor wheel is one conventional method for controlling the magnitude and/or direction of the thrust load; however, this method is generally associated with a reduction in efficiency which, especially in the case of compressors, could be significant. Another method of thrust control involves an appropriately sized thrust chamber wherein, most often, a gaseous fluid, usually the working fluid, is introduced and kept at a predetermined pressure by employing a labyrinth seal between its moving surfaces. Such a device with a fluid source of appropriate pressure, can significantly reduce the value between the uncontrolled thrust load and the operating thrust load range. Because of the difficulty in calculating the axial load, however, it is difficult to set the optimum thrust chamber pressure. Further, such a passive system is unable to accommodate the design axial load range.

Furthermore, the problems of bearing support and thrust control also arise with respect to non-rolling bearings such as hydrodynamically or hydrostatically operated journal and thrust bearings. Considering the latter, its load carrying capability has to be designed to carry the maximum thrust load which will occur in the system throughout its operating life. This again may be considerably higher than the steady-state design load. A resilient damped axial suspension with preferably constant load versus displacement characteristics will reduce the dynamic loading in an optimal manner and an active thrust control will reduce the design load. The result of these will be a smaller thrust bearing which is important since in many applications the maximum thrust load and, significantly, the energy loss can be several times higher in the thrust bearing than in the journal bearing. Concerning the journal bearing, it has long been recognized that mounting them in an elastic and damped support will greatly extend their stability limit. However it would be desirable to have improved damping of the bearing mount.

Accordingly it is an object of this invention to provide a support system for bearings supporting a rotating element of high-speed rotating machinery which can act to reduce axial bearing forces as well as dampen radial forces on the bearing and thus serve to extend the life of the bearing.

SUMMARY OF THE INVENTION

The above and other objects of the invention which will become apparent to those skilled in the art upon a reading of this disclosure are attained by the present invention which is:

A bearing support system for high-speed rotating machinery comprising:

(A) an inner ring for retention of one or more bearings in support of a rotating element of the machinery, said inner ring having at least two radially spaced slots therein;

(B) an outer ring, radially spaced from the inner ring, and attachable to a stationary element of the machinery; and (C) at least two circumferentially spaced structural members between and in contact with the inner and outer rings, and serving to support the inner ring on the outer ring, said structural members being stiff in the radial direction but flexible in the axial direction.

DETAILED DESCRIPTION

The bearing support system of this invention will be described in detail with reference to the Drawings.

Figure 1:
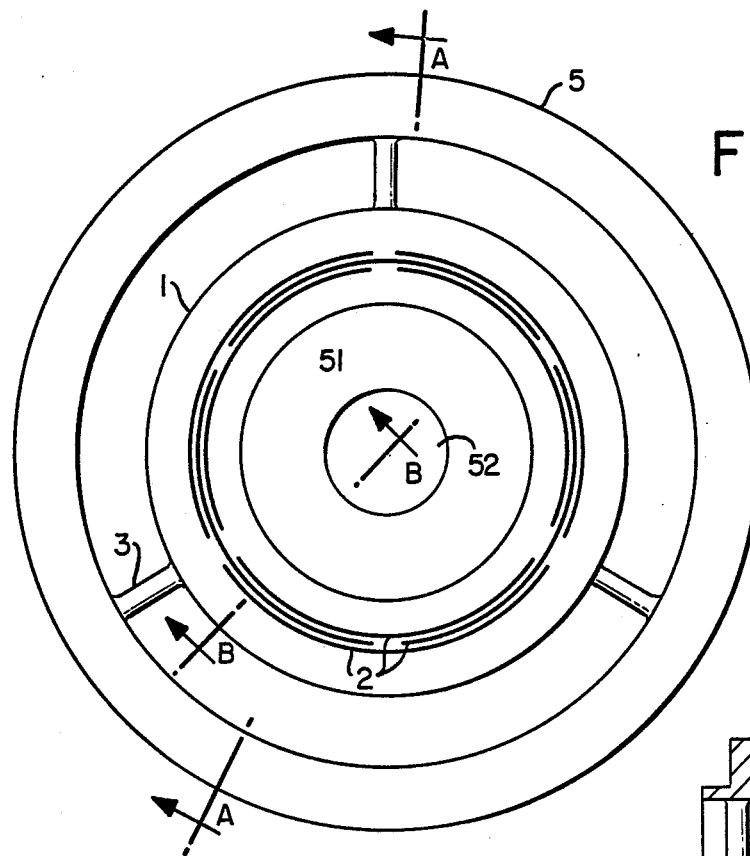
FIG. 1 is a frontal view in cross section of one preferred embodiment of the bearing support system of the invention.

Referring now to FIG. 1, inner ring 1, comprised of a metal alloy preferably having structural damping properties such as manganese alloyed steels, is provided with at least two radially-spaced slots 2 to impart radial flexibility and damping. Slotted inner ring 1 serves to retain one or more bearings in space 51 which serve to support a rotating element, such as a shaft, in space 52. The bearings are retained by the inner ring by an appropriate fit or by retaining rings.

Slots 2 may have a radial width within the range of from 0.002 to 0.100 inch and are radially spaced generally by at least 0.030 inch. Slots 2 may be patterned and offset such as at 180, 120 or 90 degrees. Slots 2 may have a depth within the range of from one to two times the width of the journal or rolling element bearing and may be empty or filled with damping material such as flexible rubber or plastic having high damping characteristics. These may have the configuration of foam where, if open celled, the interstices may be filled up with a compatible viscous fluid to increase the damping. Woven textile or felt-like inserts, which can hold the damping fluid by their capillary action, may also be used. Alternatively, thin flexible metal inserts, with damping fluid or without, are also useful to increase damping. For example, nitrite or neoprene rubber, epoxies, and polyurethane compounds may be used with mineral oil lubricated bearings. The filler material may be simply inserted into the slots or may be expended in liquid form and cured in place. Open celled elastomeric foam filled with viscous fluid could also be used. Such fluid may be the lubricant itself where the advantage is that the capillarity will keep the damping fluid between the moving surfaces without seals or o-rings. This suspension system may also be used with felt, where, once filled with oil, the oil mist lubrication of the ball bearing can keep the felt material saturated and the slots 2 filled.

Outer ring 5 is radially spaced from inner ring 1 and is attachable to the stationary element, such as the housing or other frame, of the machinery, so as to allow mounting of the bearing support within the machinery.

Between and in contact with inner ring 1 and outer ring 5 are at least two circumferentially spaced structural members 3 which serve to support inner ring 1 on outer ring 5. Structural members 3 are stiff in the radial direction but flexible in the axial direction by selection of the proper aspect ratio for their cross-section. A suitable criteria for selecting the axial flexibility value for members 3 is to allow a deflection of 20 to 80 percent, preferably 50 to 70 percent of the minimum rotor axial clearance under expected maximum axial load. Preferably structural members 3 are equidistantly circumferentially spaced.

Structural members 3 can be damped by coating them with flexible rubber or plastic compound compatible with the environment and having high damping characteristics. Alternatively, a fluid film damper may be provided at one or both faces of the inner ring 1 or a suitable elastomer may be used there for damping so as to limit the maximum axial travel of inner ring 1. Preferably at least one structural member 3 is equipped with a sensor which can detect the axial force acting on the rotor.

It will be recognized by those experienced in the mechanical design arts that although inner ring 1 is designed to provide radial flexibility and damping, it will also contribute flexibility and damping in the axial direction as well. Similarly, structural members 3 may contribute some radial resiliency. However, the construction of this invention will increase design freedom since the two parts providing the radial and axial degrees of freedom are essentially separate.

Figure 2:
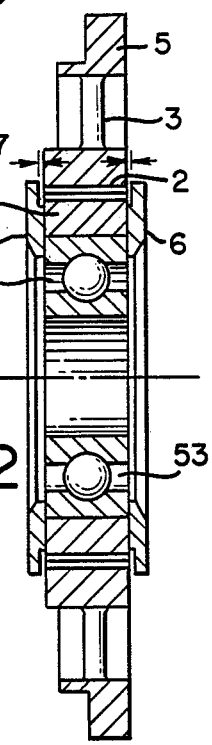
FIG. 2 is a cross-sectional view of the bearing support system of FIG. 1 taken along line A—A as it would appear with use of rolling bearings.

FIG. 2 is a cross-sectional view of FIG. 1 along line A—A and shows the bearing support supporting rolling elements bearing 53. Also shown are external stops 6 which limit the maximum axial travel of the rotor. The gaps 7 between stops 6 and inner ring 1, which may be different on the opposite sides, may be within the range of 20 to 80 percent, preferably 50 to 70 percent, of the minimum axial clearance between the rotating and stationary parts of the machine for turbomachines such as a turbo-supercharger or expansion turbine. To limit the axial travel and to minimize the effect of the dynamic axial load on the bearing, gap 7 may also be provided with damping material. Alternatively, the damping material may be applied to the outer surface of structural members 3.

Figure 3:
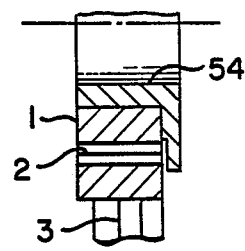
FIG. 3 is a cross-sectional view of the bearing support system of FIG. 1 taken along line B—B as it would appear with use of journal bearings.

FIG. 3 is a cross-sectional view of FIG. 1 along line B—B and shows the bearing support supporting journal bearing 54.

The invention enables the practitioner to optimize the axial stiffness and damping based on the rotor weight and the dynamic axial load conditions imposed on the rotor. The flexibility to attain such optimization derives from the ability to separately vary the number of structural members 3 employed, their radial length and their axial dimensions.

Figure 4:
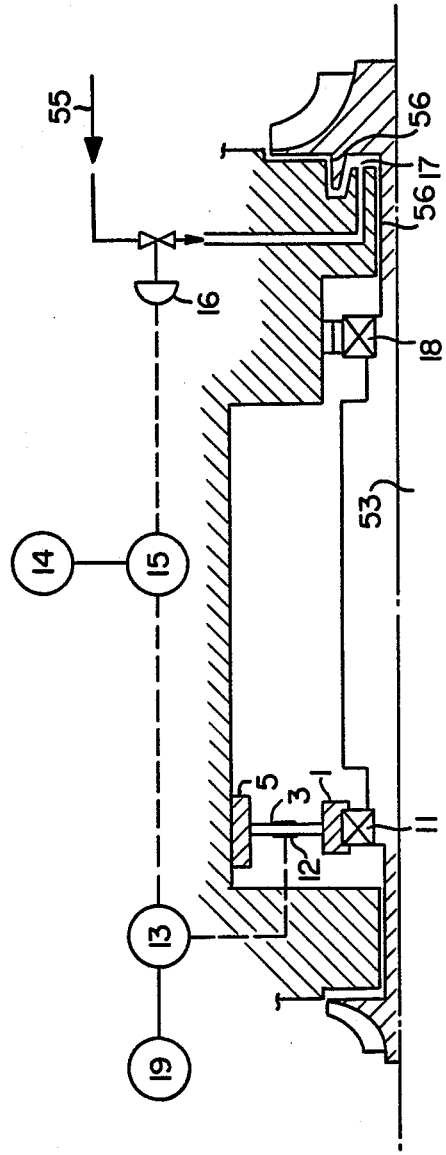
FIG. 4 is a schematic diagram of one system by which axial thrust forces acting on the bearings may be controlled and modulated.

FIG. 4 is a schematic representation of one system which may be employed to control and modulate axial thrust forces acting on the bearings.

Referring now to FIG. 4, one bearing 11 takes all the unbalanced axial thrust rotor loads on rotor 53. This bearing is suspended in an axial spring equipped with sensors to detect the rotor axial thrust loads. Sensors 12 may be responding to strain (strain gauges), linear motion (inductance, capacitance, or optical displacement probes), direct force (transducers), or the like. The inductance, capacitance, or optical displacement probes can detect the movement of the inner ring or the bearing directly. The output of the axial rotor displacement/force sensors is then transmitted into the signal conditioner 13. The conditioned signal may be displayed on a control panel 14 as a rotor force readout. For a close loop control operation, the signal is fed into a controller 15 (electric or pneumatic) and a control device 16 which is generally a control valve.

Valve 16 connects the thrust balancing pressure chamber 17 to an appropriate source of higher pressure fluid 55 upstream of the control valve through an appropriate supply line. Labyrinth seals are shown as items 56. The magnitude of the pressure in this thrust chamber is, thereby, controlled continuously at all times in such a manner as to maintain axial load on the loaded bearing 11 to its desired magnitude and direction. This is done automatically by setting the desired value on the dial at the automatic controller. The other bearing 18 may be allowed to float axially, while its axial preload could be maintained by springs only.

The force sensor 12 is precalibrated against induced rotor axial loads prior to its operation. An appropriate protective device such as force meter relay 19, may be employed to limit the rotor operation within the maximum and minimum allowable axial thrust loads in order to protect the bearing should the control circuitry fail for any reason. This increases reliability and the bearing life.

Figure 5:
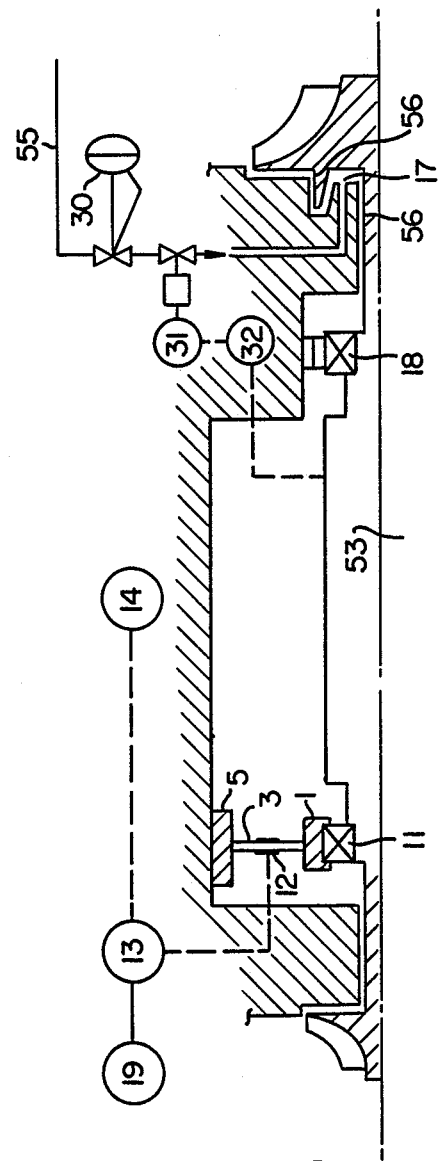
FIG. 5 is a schematic diagram of another system by which axial thrust forces acting on the bearings may be controlled and modulated.

The above described system for the axial thrust load control circuit under a close loop or active mode is a preferred method of the rotor axial thrust load control. Under certain rotor operating conditions, however, a hybrid or semi-passive system for axial thrust load control may also be applicable and useful and such a system is illustrated schematically in FIG. 5. It similarly incorporates force sensors 12, signal conditioner 13, force indicator 14, and the protective device 19. The control valve in this embodiment is a differential pressure controller 30 installed in series with a solenoid shut-off valve 31 in the supply line to the thrust balancing pressure chamber 17. The other elements illustrated in FIG. 5 are common with those, and are numbered the same as those, of FIG. 4.

It was found that in the case of a turbine driven compressor the total axial thrust load on the rotor is a function of its speed. In addition, if its normal operating speed does not change appreciably, the pressure difference between the axial thrust balancing pressure chamber and another process variable, in this case the compressor suction pressure, is also a function of its speed. Thus, the pressure in the axial thrust load control chamber can be controlled by this differential pressure regulator following the process conditions.

The solenoid control valve action is directly tied to the rotor speed by an appropriate speed meter relay 32. This system of axial thrust load control offers simplicity, but its tradeoff is a slightly variable rotor axial load.

Now by the use of the bearing support system of this invention, one can readily and effectively control the radial as well as axial thrust loads imparted onto bearings in high-speed rotating machinery such as turbocompressors and turboexpanders.

Although the invention has been described in detail with respect to certain specific embodiments, it will be appreciated by those skilled in the art that there are other embodiments of the invention encompassed within the spirit and scope of the claims.

We claim:

1. A bearing support system for high-speed rotating machinery comprising:
   (A) an inner ring for retention of one or more bearings in support of a rotating element of the machinery, said inner ring having at least two radially spaced slots therein said slots having a width within the range of from 0.002 to 0.100 inch and a depth within the range of from one to two times the width of the bearing;
   (B) an outer ring, radially spaced from the inner ring, and attachable to a stationary element of the machinery; and
   (C) at least two circumferentially spaced structural members between and in contact with the inner and outer rings, and serving to support the inner ring on the outer ring, said structural members being stiff in the radial direction but flexible in the axial direction.

2. The bearing support system of claim 1 wherein the bearings are rolling elements bearings.

3. The bearing support system of claim 1 wherein the bearings are journal bearings.

4. The bearing support system of claim 1 wherein the slots are offset by 90 degrees with respect to each other.

5. The bearing support system of claim 1 wherein the slots are offset by 120 degrees with respect to each other.

6. The bearing support system of claim 1 wherein the slots are offset by 180 degrees with respect to each other.

7. The bearing support system of claim 1 wherein the slots are empty.

8. The bearing support system of claim 1 wherein the slots contain damping material.

9. The bearing support system of claim 1 wherein the flexibility of the structural members in the axial direction allows a deflection of 20 to 80 percent of the minimum rotating element clearance under expected maximum axial load.

10. The bearing support system of claim 1 wherein the structural members are equidistantly circumferentially spaced.

11. The bearing support system of claim 1 wherein the structural members are damped by having a coating of damping material.

12. The bearing support system of claim 1 wherein the inner ring contains damping material on at least one of its faces.

13. The bearing support system of claim 1 wherein at least one structural member is equipped with a sensor which can detect axial force on the structural member.

14. The bearing support system of claim 13 wherein the force sensor is connected electronically to a valve controller controlling a valve which passes high pressure fluid to compensate for axial 15. A bearing support system for high-speed rotating machinery comprising:
   (A) an inner ring for retention of one or more bearings in support of a rotating element of the machinery, said inner ring having at least two radially spaced slots therein and wherein the inner ring contains damping material on at least one of its faces;
   (B) an outer ring, radially spaced from the inner ring, and attachable to a stationary element of the machinery; and
   (C) at least two circumferentially spaced structural members between and in contact with the inner and outer rings, and serving to support the inner ring on the outer ring, said structural members being stiff in the radial direction but flexible in the axial direction.

16. A bearing support system for high-speed rotating machinery comprising:
   (A) an inner ring for retention of one or more bearings in support of a rotating element of the machinery, said inner ring having at least two radially spaced slots therein;
   (B) an outer ring, radially spaced from the inner ring, and attachable to a stationary element of the machinery; and
   (C) at least two circumferentially spaced structural members between and in contact with the inner and outer rings, and serving to support the inner ring on the outer ring, said structural members being stiff in the radial direction but flexible in the axial direction, wherein the structural members are damped by having a coating of damping material.

17. A bearing support system for high-speed rotating machinery comprising:
   (A) an inner ring for retention of one or more bearings in support of a rotating element of the machinery, said inner ring having at least two radially spaced slots therein;
   (B) an outer ring, radially spaced from the inner ring, and attachable to a stationary element of the machinery; and
   (C) at least two circumferentially spaced structural members between and in contact with the inner and outer rings, and serving to support the inner ring on the outer ring, said structural members being stiff in the radial direction but flexible in the axial direction wherein at least one structural member is equipped with a sensor which can detect axial force on the structural member.

18. The bearing support system of claim 17 wherein the force sensor is connected electronically to a valve controller controlling a valve which passes high pressure fluid to compensate for axial thrust on the bearing and maintain axial load within a desired range.

* * * * *

UNITED STATES PATENT AND TRADEMARK OFFICE
CERTIFICATE OF CORRECTION

PATENT NO. : 4,900,165
DATED : February 13, 1990
INVENTOR(S) : Leslie C. Kun and Neno T. Nenov It is certified that error appears in the above-identified patent and that said Letters Patent is hereby corrected as shown below:

Amend claim 14 to read as follows:

14. The bearing support system of claim 13 wherein the force sensor is connected electronically to a valve controller controlling a valve which passes high pressure fluid to compensate for axial thrust on the bearing and maintain axial load within a desired range.

Signed and Sealed this

Eighteenth Day of June, 1991

*Attest:*

HARRY F. MANBECK, JR.

*Attesting Officer*      *Commissioner of Patents and Trademarks*